Patented Jan. 1, 1952

2,580,475

UNITED STATES PATENT OFFICE 2,580,475

IMIDAZOLINYLALKYL ETHERS OF PYRIDYLCARBINOLS

Nathan Sperber, Bronx, and Domenick Papa, Brooklyn, N. Y., and Erwin Schwenk, Montclair, N. J., assignors to Schering Corporation, Bloomfield, N. J., a corporation of New Jersey No Drawing. Application October 30, 1947, Serial No. 783,214

10 Claims. (Cl. 260—296)

The present invention relates to a new group of organic compounds having interesting and important physiological activity. More specifically, the invention relates to imidazolinylalkyl ethers of pyridyl-substituted carbinols and methanethiols having pronounced antihistaminic activity.

It is recognized that the liberation of histamine into the tissues which can be brought about by a multitude of agents or processes is primarily responsible for many of the allergic manifestations in man. It has been found that certain substances of closely related chemical configuration are effective in alleviating the symptoms of many allergic reactions. Although the substances prescribed at the present time represent a remarkable advance, they nevertheless exhibit many undesirable side effects, or so-called toxic reactions, among which may be mentioned drowsiness, dizziness, nausea, gastro-intestinal irritation and dryness of the mouth.

We have now found that imidazolinylalkyl ethers of pyridyl-substituted carbinols and methanethiols of the following general formula:

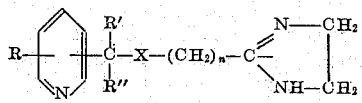

wherein R is hydrogen, halogen, or a lower alkyl or alkoxy group, R' is an alkyl group containing not more than eight carbon atoms, a cycloalkyl, an aryl, an aralkyl or a heterocyclic group wherein the aryl, aralkyl or the heterocyclic group may be substituted by halogen, a lower alkyl, an alkoxyl or a dialkyl amino group, X is oxygen or sulfur, R" is hydrogen or a lower alkyl group and n is an integer from 1 to 4. These compounds not only show high antihistaminic activity, but also are devoid of any so-called side or toxic reactions.

In general, the compounds of the present invention may be prepared by the reaction of an appropriate carbinol or thiol with an imidazolinylalkyl halide. For example, by reacting a pyridyl aryl carbinol with sodium powder in an inert organic solvent such as benzene or toluene, there is obtained the sodio derivative of the carbinol which can then be condensed with an imidazolinylalkyl halide to secure the ether. For example, phenyl-(2-pyridyl) carbinol is added to a toluene suspension of the equivalent amount of finely powdered sodium. After heating for several hours, the reaction mixture is then treated with an equivalent amount of 2-(chloromethyl)imidazoline. After several hours of heating on the steam bath, the reaction is completed and then decomposed by the cautious addition of water. The aminoether so obtained is purified by solution in hydrochloric acid, the neutral and acidic products remaining the organic solvent. The acid solution is then made alkaline with gaseous ammonia. The liberated oily aminoether is then extracted with an organic solvent and purified by distillation. In place of sodium metal, potassium metal, sodamide, potassium amide, lithium amide or other similar condensing agents may be used. Other solvents such as xylene and ether have been found satisfactory.

The preparation of the requisite carbinols is described in our co-pending application, Serial No. 718,624, filed December 26, 1946. In addition, certain of the carbinols may be made by reacting picolinic acid with benzaldehyde or acetophenone or their substitution products with or without solvents. For example, by heating to a temperature of approximately 150-175° C. picolinic acid and an excess of benzaldehyde, there is obtained a fair yield of phenyl-(2-pyridyl)-carbinol. Slightly better yields may be secured when the above-described reaction is conducted in the presence of an inert solvent having a boiling point in the range of approximately 150-200° C.

The compounds of the present invention may be used in the form of their salts. Of particular interest are the hydrohalide salts, especially the hydrochlorides which may be readily made by any of the conventional methods.

The following compounds are illustrative of the types of substances of the invention which may be made by the hereinabove-described reactions:

Phenyl(2-pyridyl)(2-imidazolinylmethoxy)-methane.

3,4-dimethoxyphenyl(2-pyridyl)(2-imidazolinylmethoxy)methane.

1-phenyl-1-(2-pyridyl)-1-(2-imidazolinylmethoxy)ethane.

p-Bromobenzyl(2-pyridyl)(2-imidazolinylmethoxy)methane.

o-Tolyl(2-pyridyl)(2-imidazolinylmethoxy)-methane.

2-thienyl(2-pyridyl)(2-imidazolinylmethoxy)methane.

EXAMPLE

*p - Tolyl(2 - pyridyl)(2 - imidazolinylmethoxy)-methane*

To one mole of sodium amide in one liter of dry xylene is added one mole of p-tolyl(2-pyridyl)carbinol and the reaction mixture is heated and stirred for several hours on the steam bath until the evolution of ammonia has ceased. To the cooled reaction mixture are added 1.1 moles of 2-(chloromethyl)imidazoline hydrochloride (Djerassi and Scholz, J. Am. Chem. Soc. 69, 1688 (1947)) and 1.1 moles of sodium amide. The flask is heated and stirred for 18-24 hours on the steam bath. The cooled mixture is decomposed with water, the organic layer washed with water and dried over sodium sulfate. The solvent is removed in vacuo and the residue is fractionated, B. P. 170-175° C./1.5 mm., yellow oil.

This reaction may be carried out by substituting sodium metal, potassium metal, lithium metal or their respective amides, as well as other suitable condensing catalysts, for the sodium amide.

The following are typical compounds of the invention which may be made by the procedure of the example from the indicated carbinol and 2-(chloromethyl)imidazoline:

1. Phenyl(2 - pyridyl)(2 - imidazolinylmethoxy)methane, B. P. 160-165° C./0.5 mm. from phenyl(2-pyridyl)carbinol.
2. p - Isopropylphenyl(2 - pyridyl)(2 - imidazolinylmethoxy)methane, B. P. 172-175° C./1 mm., from p-isopropyl(2-pyridyl)carbinol.
3. p - Methoxyphenyl(2 - pyridyl)(2 - imidazolinylmethoxy)methane, B. P. 175-178° C./0.5 mm., from p - methoxyphenyl(2 - pyridyl)-carbinol.
4. n-Butyl(2-pyridyl)(2-imidazolinylmethoxy)-methane, B. P. 125-130° C./1 mm., from n-butyl(2-pyridyl)carbinol.
5. β-Phenethyl(2-pyridyl)(2-imidazolinylmethoxy)methane, B. P. 175° C./1 mm., from -phenethyl(2-pyridyl)carbinol.
6. 2 - thienyl(2-pyridyl) (2 - imidazolinylmethoxy)methane, B. P. 150-152° C./0.5 mm., from 2-thienyl(2-pyridyl)carbinol.
7. Phenyl(4 - pyridyl)(2 - imidazolinylmethoxy)methane, B. P. 160° C./0.5 mm., from phenyl(4-pyridyl)carbinol.
8. Cyclohexyl(2 - pyridyl)(2-imidazolinylmethoxy)methane, B. P. 165-168° C./1 mm., from cyclohexyl(2-pyridyl)carbinol.
9. Benzyl(2 - pyridyl)(2 - imidazolinylmethoxy)methane, B. P. 172-175° C./1 mm., from benzyl(2-pyridyl)carbinol.
10. o-Tolyl(2 - pyridyl)(2 - imidazolinylmethoxy)methane, B. P. 170° C./1.5 mm., from o-tolyl(2-pyridyl)carbinol.
11. m-Tolyl(2 - pyridyl)(2 - imidazolinylmethoxy)methane, B. P. 170° C./1.5 mm., from m-tolyl(2-pyridyl)carbinol.
12. 2 - pyridyl(3-pyridyl)(2 - imidazolinylmethoxy)methane, B. P. 175-177° C./1.5 mm., from 2-pyridyl(3-pyridyl)carbinol.
13. 3,4-dimethoxyphenyl(2 - pyridyl) (2-imidazolinylmethoxy)methane, B. P. 185° C./1 mm., from 3,4-dimethoxyphenyl(2-pyridyl)-carbinol.
14. 1 - phenyl-1-(2-pyridyl)-1-(2-imidazolinylmethoxy)ethane, B. P. 165-167° C./0.5 mm.

We claim:
1. A method of making compounds of antihistaminic activity which comprises heating a compound of the general formula

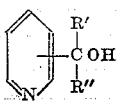

wherein R' is selected from the group consisting of alkyl groups containing not more than four carbon atoms, monocyclic cycloalkyl, monocyclic aryl, monocyclic aralkyl pyridyl and thienyl groups and halogen, lower alkyl and alkoxy substituted monocyclic aryl and monocyclic aralkyl groups, and R'' is selected from the group consisting of hydrogen and lower alkyl groups with a 2-imidazolinylalkyl halide in the presence of a condensing agent and recovering the compound thereby produced of the general formula

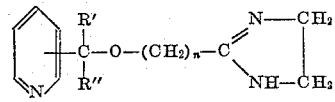

wherein $n$ is an integer from 1 to 4 and R' and R'' are as defined above.

2. A method of making compounds of antihistaminic activity which comprises heating a monocyclic aryl-(pyridyl)-carbinol with a 2-imidazolinylalkyl halide in the presence of a condensing agent and recovering the 2-imidazolinylalkyl ether of a monocyclic aryl-(pyridyl)-carbinol thereby produced.

3. A method of making phenyl(2-pyridyl)-(2-imidazolinylmethoxy)-methane which comprises heating phenyl (2-pyridyl) carbinol with a 2-imidazolinylmethyl halide in the presence of a condensing agent and recovering the phenyl(2-pyridyl) (2 - imidazolinylmethoxy) - methane thereby produced.

4. Compounds of antihistaminic activity selected from the group of compounds of the general formula

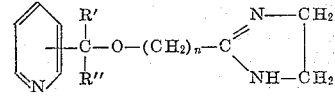

wherein R' is selected from the group consisting of alkyl groups containing not more than four carbon atoms, monocyclic cycloalkyl, monocyclic aryl, monocyclic aralkyl pyridyl and thienyl groups, and halogen, lower alkyl and alkoxy substituted monocyclic aryl and monocyclic aralkyl groups, R'' is selected from the group consisting of hydrogen and lower alkyl groups, and $n$ is an integer from 1 to 4, and the acid salts thereof.

5. An antihistaminic compound selected from the group consisting of 2-imidazolinylalkyl ethers of aryl(pyridyl)carbinols and the acid salts thereof.

6. An antihistaminic compound selected from the group consisting of p-tolyl(2-pyridyl) (2-imidazolinylmethoxy)methane and its hydrochloride.

7. An antihistaminic compound selected from the group consisting of phenyl(2-pyridyl) (2-imidazolinylmethoxy)methane and its hydrochloride.

8. An antihistaminic compound selected from the group consisting of p-isopropylphenyl(2-pyridyl) (2-imidazolinylmethoxy)methane and its hydrochloride.

9. An antihistaminic compound selected from the group consisting of p-methoxyphenyl(2-pyridyl) (2 - imidazolinylmethoxy)methane and its hydrochloride.

10. An antihistaminic compound selected from the group consisting of benzyl(2-pyridyl)(2- imidazolinylmethoxy)methane and its hydrochloride.

NATHAN SPERBER.
DOMENICK PAPA.
ERWIN SCHWENK.

REFERENCES CITED

The following references are of record in the file of this patent:

Richter: Textbook of Organic Chemistry, 1938 edition, pp. 83-84, John Wiley & Sons, New York.

Hartman: California Medicine, 66 (No. 4), 242-248 (1947).

Richter: Textbook of Organic Chemistry, pp. 649-650.

Alles: Jour. of Pharmaceutical and Experimental Therapy, 72, 265 (1941).

Sidgwick: Organic Chemistry of Nitrogen, p. 522 (1945).

Chemical Abstracts, 41, 6989 f, g, (1947) refers to Farm Sci. et tec. 2, 94-96 (1947).